April 29, 1969     J. TOTH ET AL     3,440,750

DISPLAY AND AMUSEMENT APPARATUS

Filed July 18, 1966

INVENTORS
JOSEPH TOTH
GEORGE LOVAS
BY
ATTORNEY

INVENTORS
JOSEPH TOTH
GEORGE LOVAS

United States Patent Office 3,440,750
Patented Apr. 29, 1969

3,440,750
DISPLAY AND AMUSEMENT APPARATUS
Joseph Toth, South Bend, Ind., and George Lovas, 1902
W. Ewing Ave., South Bend, Ind. 41613; said Toth
assignor to said Lovas
Filed July 18, 1966, Ser. No. 565,818
Int. Cl. G09f 1/10, 7/02
U.S. Cl. 40—140                    2 Claims

ABSTRACT OF THE DISCLOSURE

A display and amusement apparatus in which three dimensional characters of plastic foam are removably secured to a rigid board by static electricity. The three dimensional characters may form several layers projecting outwardly from the board and may be held to the board and to each other by a slight fusion of the plastic material resulting from the vigorous rubbing of the characters on a surface.

---

Various types of display boards and panels used in combination with characters, such as letters and numbers, and with removable plastic or paper strips or panels containing printed matter or pictures have been used in the past. These are commonly referred to as felt or flannel boards and the strips or panels adhere to the felt or flannel surfaces and are easily removable therefrom. While this type of board serves certain display purposes effectively, it is not versatile, and its use is limited to characters or material of little thickness, such as paper or cardboard. Other types of boards have been devised for use in a vertical position, but these generally use a mechanical type of securing means for the removable characters or figures, and hence have not been versatile enough to become extensively used. It is therefore one of the principal objects of the present invention to provide a display and amusement apparatus having a vertically positioned display surface or panel and readily removable characters and figures which will adhere to the surface when the characters or figures are merely placed against the surface, and which have sufficient thickness to project from the surface, giving the characters or figures a distinctly three dimensional appearance.

Another object of the invention is to provide a highly versatile, easily handled and manipulated apparatus of the aforementioned type, in which the characters can be arranged in a variety of different forms and shapes and readily shifted or otherwise changed to other forms and shapes, and in which composite characters and figures projecting forwardly and/or upwardly can be assembled or supported by the vertically positioned surface.

Still another object is to provide a relatively simple display and amusement apparatus which can be constructed of a number of different materials, and which employs a variety of different shapes to make original displays and characterizations for either temporary or permanent use, and which can be easily transported and assembled in various locations and positions.

Further objects and advantages of the invention will become apparent from the following description and accompanying drawings, wherein.

Figure 1:
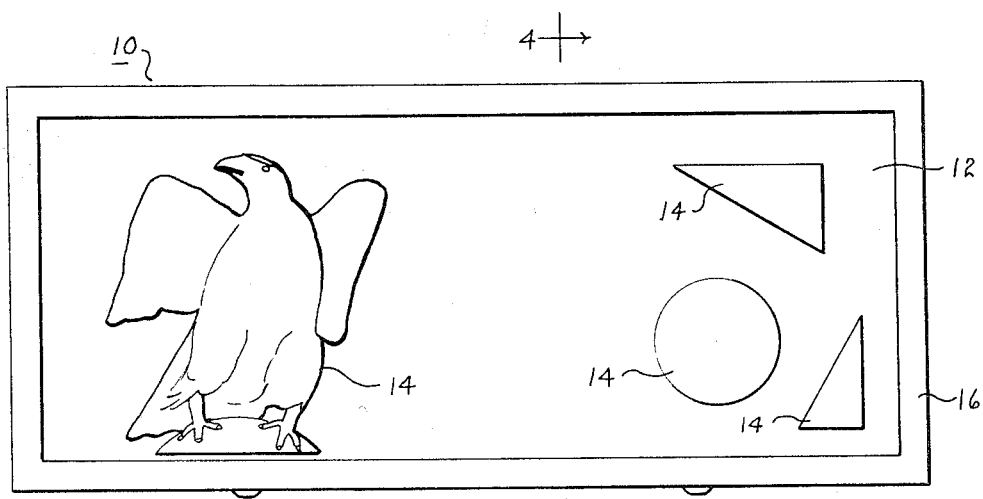
FIGURE 1 is a front elevational view of a board having characters and figures thereon, illustrating the use of the present invention.
Figures 2, 3:
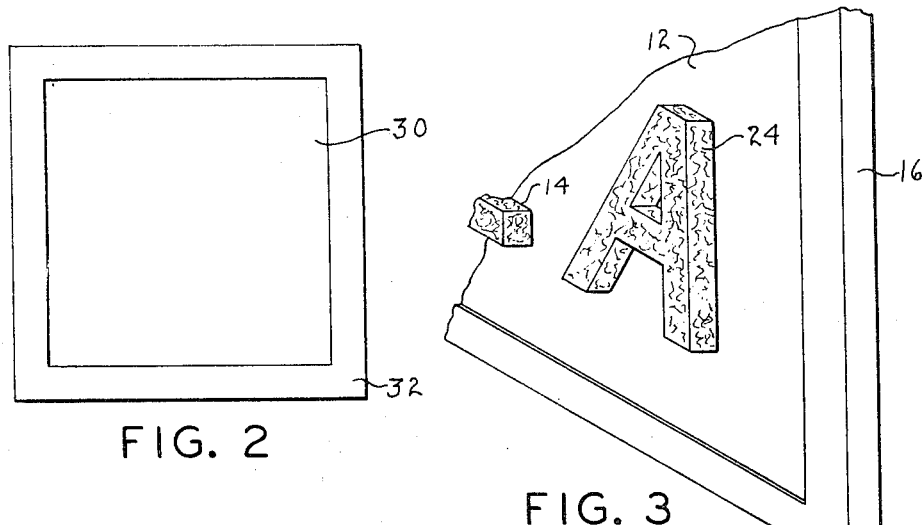
FIGURE 2 is a panel used in preparing the characters and figures for mounting on the board illustrated in FIGURE 1.
Figure 4:
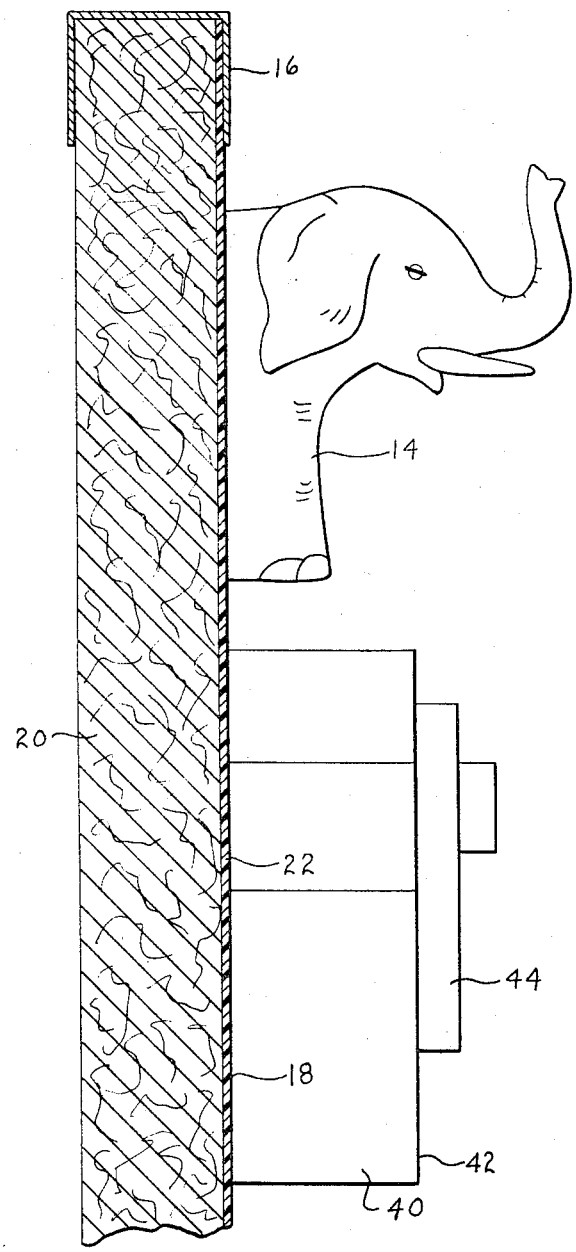

FIGURE 3 is a fragmentary elevational view showing in more detail the manner in which the characters and figures are mounted on the board; and FIGURE 4 is a vertical cross sectional view of the apparatus illustrated in FIGURES 1 and 3, the section being taken on line 4—4 of FIGURE 1, and showing a different type of character in order better to illustrate the three dimensional possibilities of the invention.

Referring more specifically to the drawings, numeral 10 designates generally the present apparatus having a board 12 and characters and figures 14 mounted on the board. Board 12 has a frame 16, primarily for the purpose of giving it a finished appearance. The board may be placed on a table, easel or on the floor, or hung on the wall. In most uses, the front surface 18 of the board would be in a vertical or substantially vertical position.

Board 12 may be constructed of a variety of different materials and shapes, the one shown in the drawing consisting of a stiff fiberboard backing member 20 having a thin, relatively smooth layer 22 of plaster or plastic material secured to the surface of member 20. The entire board may be made of plaster, or it may have a construction similar to the conventional plaster-board, such as gypsum filler with a thin layer of paper on the two surfaces thereof. The surface of layer 22 on which the characters and figures are mounted may be either smooth or roughened, and is preferably relatively hard, although a soft surface, such as that provided by felt or fuzzy material, can be used effectively. The boards may be of any size and shape, although normally they are sufficiently small that they can be readily carried from room to room or place to place and set up without having to use separate sections.

The characters and figures used in conjunction with the foregoing board are constructed of plastic foam, preferably either polystyrene foam or polyethylene foam, and are cut or molded into various desired shapes, such as the letter A indicated at numeral 24 in FIGURE 3. As can be seen from the drawings, the characters and figures are relatively thick and project forwardly a substantial distance from the surface of board 12. The front face of the characters or figures may have a layer or coating of any type of material, such as paper, plastic or paint, to improve their appearance. However, the rear side thereof must have the polystyrene or polyethylene exposed surface.

The characters and figures are secured to the board by static electricity either alone or in combination with a chemical adhesion, both of which are created by rubbing or other suitable friction action on a suitable surface. FIGURE 2 illustrates a panel 30 of paper or fiber material, such as corrugated fiberboard, which presents a relatively smooth surface on which the characters can be rubbed. In the figure illustrated in FIGURE 2, a frame 32 is preferably used to provide a finished appearance and to give adequate rigidity and stability to the panel. The material forming the panel may be of any thickness, so long as it is substantially rigid and will hold its shape while it is being rubbed by the characters or figures. Rubbing the characters and figures on the surface of the panel creates static electricity, charging the characters and figures sufficiently to cause them to adhere to the surface of board 12. In addition to securing the characters and figures to the surface of board 12 with static electricity, a light chemical adhesion is also obtained by vigorous rubbing of the characters and figures on the surface of panel 30 sufficiently to slightly fuse the rear surfaces of the characters and figures, so that if they are placed on the board immediately after the rubbing action, the lightly fused material is sufficiently tacky to adhere to the surface of the board. The adherence obtained by the slight fusion of the rear surface of the characters and figures is not sufficient to interfere with easy removal of the characters and figures from the surface of the board when desired.

An important feature of the present invention is the material from which the characters and figures are made. Polystyrene foam and polyethylene foam are relatively light, and hence can be formed into various shapes which extend a substantial distance from the surface of board 12 when mounted thereon. This permits the formation of distinctly three dimensional displays and characterizations which can be easily assembled by the charging of the characters and figures with static electricity, and yet which can be easily shifted or otherwise rearranged on the board without recharging the characters or figures. Further, once the characters and figures have been assembled in the foregoing manner, either with the use of the electrical charge and/or the slight fusion of the plastic material, the displays or characterizations will, in effect, become permanent assemblies which will remain in place until they are intentionally disassembled. For forming the permanent displays and characterizations, it is necessary to obtain an effective electrical charge and preferably to create the slight fusion by the rubbing of the characters and figures on the surface of board 30, or another suitable surface.

In addition to the three dimensional structure previously described herein, a compound structure can be formed in which one character is placed in front of or on top of another character adhering to the surface of board 12. In order to properly obtain such a compound structural arrangement, the characters or figures initially placed on the board preferably are provided with a surface, such as plastic or a thin fibrous layer to which the polystyrene foam or polyethylene foam will readily adhere when electrically charged, or slightly fused. Such characters are indicated in FIGURE 4 in which the polystyrene or polyethylene foam body is indicated by numeral 40 and a layer of suitable plastic or fibrous material 42 is secured thereto by any suitable securing means, such as cement or by a fusion process. The successive layer 44, or layers, may be of the same construction as the initial characters and figures illustrated in FIGURE 3, with or without a layer such as 42, unless a further compound structure is to be formed.

While only one embodiment and several modifications of the display and amusement apparatus have been described in detail herein, various changes and modifications may be made without departing from the scope of the invention.

We claim:

1. A display and amusement apparatus comprising a substantially rigid board of firm construction, and a character of substantially rigid plastic foam having the property of readily developing a charge of static electricity in response to friction from rubbing said character on a surface, securing said character to said board, said character being of substantial thickness having the distinct appearance of a three dimensional structure, and said plastic foam having a thin initially tacky layer following the rubbing operation, engaging the adjacent surface of said board to assist in retaining said character on said board until intentionally removed therefrom.

2. A display and amusement apparatus as defined in claim 1, in which said character is made of polyethylene foam.

References Cited

UNITED STATES PATENTS

| 1,265,720 | 5/1918 | Andree | 46—16 |
| 2,293,887 | 8/1942 | Chamberlain | 40—125 |
| 2,586,009 | 2/1952 | Dickey | 40—140 |

FOREIGN PATENTS

| 491,926 | 9/1938 | Great Britain. |
| 627,881 | 8/1949 | Great Britain. |

OTHER REFERENCES

The Welch Scientific Company Catalog, 1965 ed., p. 180.

EUGENE R. CAPOZIO, *Primary Examiner.*

W. J. CONTRERAS, *Assistant Examiner.*

U.S. Cl. X.R.

40—125, 158